United States Patent [19]
Rathbun

[11] Patent Number: 5,505,331
[45] Date of Patent: Apr. 9, 1996

[54] PLASTIC RECYCLABLE CONTAINER

[75] Inventor: W. John Rathbun, Castalia, Ohio

[73] Assignee: Rathbun Family Real Estate Group, Castalia, Ohio

[21] Appl. No.: 243,699

[22] Filed: May 17, 1994

[51] Int. Cl.⁶ .................................................. B65D 25/10
[52] U.S. Cl. .................... 220/764; 220/763; 220/770; 206/506; 206/519; 16/110.5; 16/126
[58] Field of Search .................... 220/760, 762, 220/763, 764, 765, 770, 775, 776; 215/100 A, 397; 206/505, 506, 519; 16/110.5, 111 R, 112, 126

[56] References Cited

U.S. PATENT DOCUMENTS

| | | |
|---|---|---|
| 1,512,163 | 10/1924 | Duckett .................................. 220/764 |
| 3,420,400 | 1/1969 | Heisler . |
| 3,866,791 | 2/1975 | Roper et al. ........................ 220/519 X |
| 3,884,380 | 5/1975 | Prochnow et al. . |
| 3,924,775 | 12/1975 | Andreaggi et al. ................. 220/764 X |
| 4,215,789 | 8/1980 | Pfeifer .................................. 220/762 |
| 4,282,984 | 8/1981 | Curry, Jr. . |
| 4,795,116 | 1/1989 | Kohut et al. .............................. 248/73 |
| 4,796,775 | 1/1989 | Dudzik . |
| 4,799,306 | 1/1989 | Collins et al. . |
| 4,801,034 | 1/1989 | Sandomeno . |
| 4,813,568 | 3/1989 | Fuehrer . |
| 4,896,415 | 1/1990 | Bock . |
| 5,154,303 | 10/1992 | Jordan .................................. 220/23.86 |

FOREIGN PATENT DOCUMENTS

| | | |
|---|---|---|
| 1455338 | 9/1966 | France ..................................... 220/775 |
| 2136387 | 9/1984 | United Kingdom . |

*Primary Examiner*—Allan N. Shoap
*Assistant Examiner*—Stephen Cronin
*Attorney, Agent, or Firm*—Emch, Schaffer, Schaub & Porcello

[57] ABSTRACT

A plastic recyclable container including a container body having a bottom and a continuous sidewall. A pair of ears are positioned on the sidewall and include opposed shaped openings. A plastic handle has a connector assembly at each end including a pair of inwardly directed projections received by the openings. The projections include holding members positioned within the ears. The cross-section of the projections is shaped complementary with the ear openings ensuring that the handle can be moved to different predetermined positions.

12 Claims, 2 Drawing Sheets

5,505,331

PLASTIC RECYCLABLE CONTAINER

BACKGROUND OF THE INVENTION

The present invention is directed to a plastic recyclable container. More specifically, the present invention is directed to an improved plastic container such as a pail.

Plastic containers are known in the prior art. For example, plastic containers are disclosed in U.S. Pat. Nos. 4,796,755; 4,799,306; and 4,896,415.

The primary object of the present invention is to provide an improved plastic recyclable container having an improved connector assembly on the handle. The connector assembly mates with a shaped opening defined by the sidewall of the container body. The connector assembly provides for a pivotal connection which can be moved to predetermined positionings where it is held in a self-supporting position. In addition, the connector assembly provides a secure connection with the container body.

SUMMARY OF THE INVENTION

The present invention is directed to a plastic recyclable container. The container includes a plastic container body having a bottom and a continuous sidewall extending upwardly from the bottom. A pair of opposed openings are defined in the sidewall. A plastic handle includes connector assemblies positioned at each end. Each of the connector assemblies has a pair of inwardly directed projections which are received in one of the container openings.

DESCRIPTION OF THE PREFERRED EMBODIMENT

Figure 1:
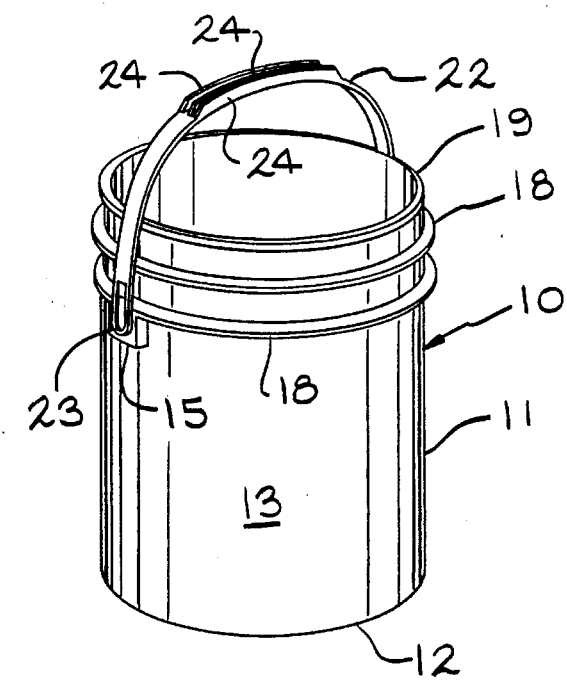
FIG. 1 is a perspective view of a plastic recyclable container, according to the present invention.

A plastic recyclable container, according to the present invention, is generally indicated by the reference number 10. The container 10 includes a container body 11 having a bottom 12 and a continuous sidewall 13.

Figure 3:
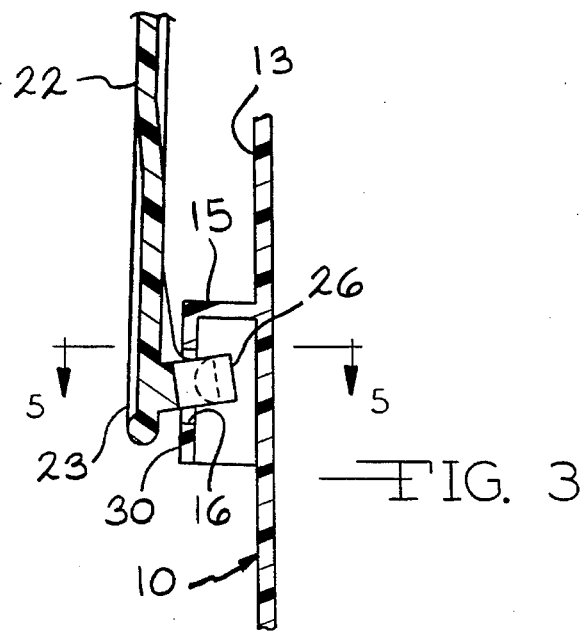
FIG. 3 is a fragmentary cross-sectional view taken along the line 3—3 of FIG. 2.

The container 10 shown in the drawings is a five gallon plastic recyclable pail and the sidewall 13 has a cylindrical configuration. Other shapes of plastic recyclable containers may be utilized and fall within the scope of the present invention. Referring to FIGS. 1 and 3, the sidewall 13 includes a pair of integral and opposed ears 15. Each of the ears 15 define an opening 16. In the present embodiment, the openings 16 have a generally rectangular shape.

Figure 4:
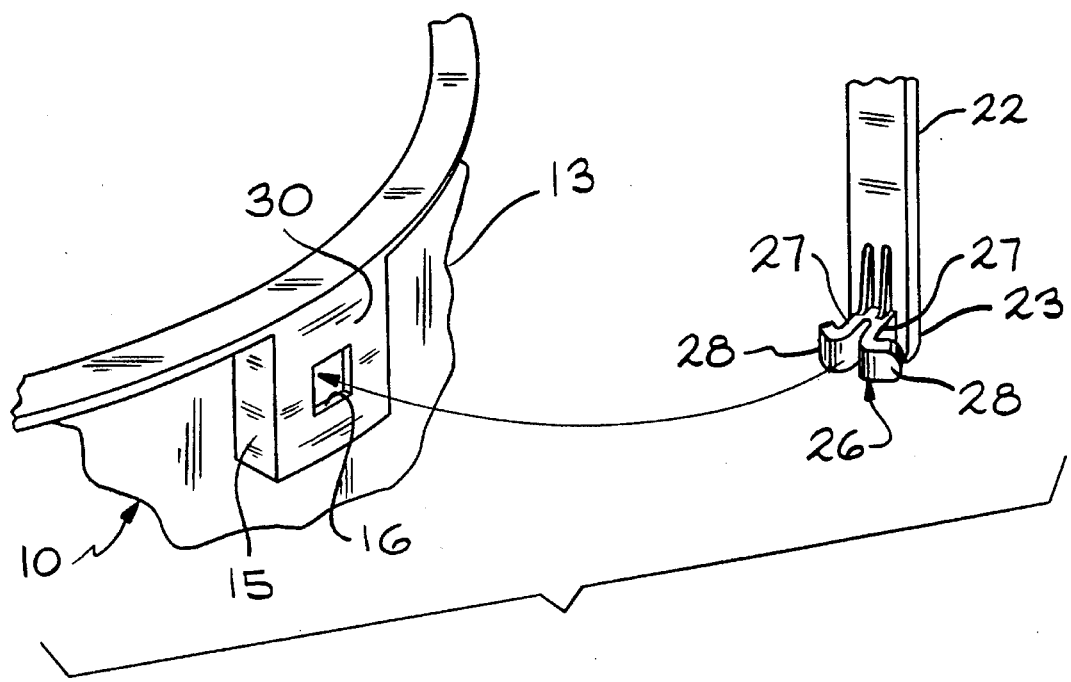
FIG. 4 is a fragmentary exploded view showing the handle and a connector assembly prior to its insertion in the container body opening.
Figure 5:
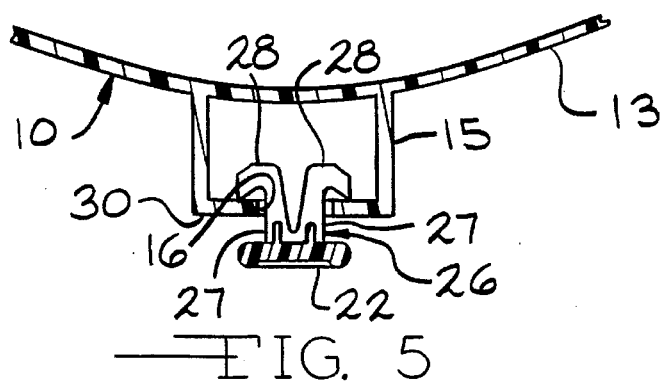
FIG. 5 is a fragmentary cross-sectional view taken along the line 5—5 of FIG. 3.

The container 10 has a plurality of circular reinforcing flanges 18 which are integral with the sidewall 13 and located in the upper portion of the container 10. A circular bead 19 is integral with and located at the upper end of the sidewall 13 of the container body 11. A plastic handle 22 includes opposed ends 23 and integral ridges 24 extending upwardly in the center of the handle 22. The ridges 24 serve as a grip for the user of the container 10. Referring to FIGS. 4 and 5, a connector assembly 26 is provided at each of the opposed ends 23. The connector assemblies 26 are an important feature of the present invention. The connector assembly 26 includes a pair of inwardly directed legs or projections 27 which are generally "V" shaped. Ear projections 27 include rearwardly directed holding members 28 at their outer ends. The ear 15 of the sidewall 13 includes a wall 30 which defines the opening 16. After insulation of the legs or projections 27 within the opening 16 of the ear 15, the rearwardly directed holding members 28 are positioned adjacent to the wall 30 of the ear 15.

Figure 2:
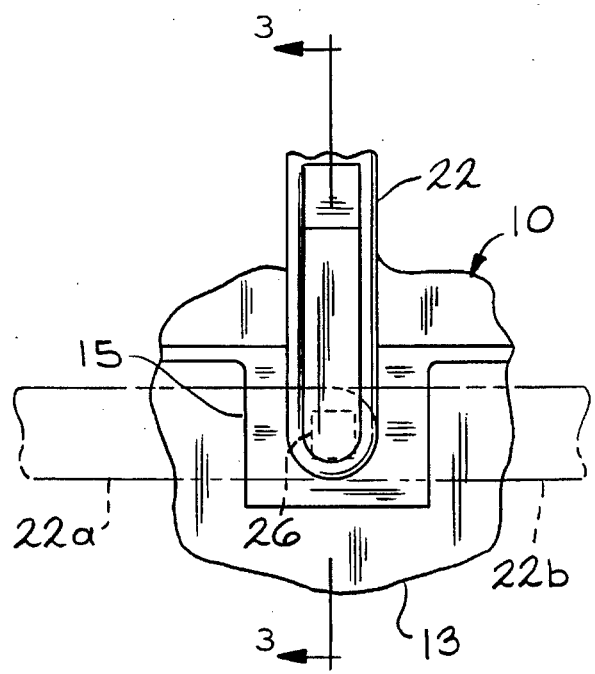
FIG. 2 is a fragmentary plan view of the connection between the handle and the container body, showing alternative handle positions in dashed lines.

Referring to FIGS. 4 and 5, the legs or projections 27 after installation define a generally rectangular cross-section which is complementary with the generally rectangular shape of the openings 16. As the plastic handle 22 is pivotally moved relative to the ears 15, the projections 27 engage the edges of the opening 16 and must be forced upwardly or downwardly. When the projections are in the top center position indicated by the solid line position of the handle 22 shown in FIG. 2, the mating complementary relationship between the projections 27 of the connector assemblies 26 and the shaped openings 16 of the ears 15 hold or secure the plastic handle 22 in its predetermined upright position. Two other predetermined positions of the plastic handle 22 are indicated by the reference numbers 22A and 22B in FIG. 2. The designed cross-section of the projections 27 adjacent the walls 30 of the ears 15 ensure that the handle 20 can be moved and held at the different predetermined positions. This feature is important when the plastic recyclable containers 10 are used, for example, as food containers. When the plastic handles 22 are moved, for example to the position 22A containers can be placed on a conveyor and filled with the food product, without interference by the handles 22.

The preferred embodiment of the plastic recyclable container 10 is constructed of a high density polyethylene. However, other types of plastics such as polypropylene and vinyl may also be utilized. The present plastic recyclable container 10 is formed by an injection molding process. An important feature of the overall container 10 is that it is completely recyclable with no metal components.

In addition to recyclability, the fact that the container does not include parts that can rust is particularly important in the food processing industry.

During assembly, the individual projections 27 of a connector assembly 26 are moved toward one another and inserted in the opening 16 in the ear 15. When released, the projections 27 are in the relationship shown in FIG. 5. The projections are generally "V" shaped and the holding members 28 are positioned adjacent to the walls 30 of the ears 15.

Many revisions and modifications may be made to the container structure shown in the drawings and described above without departing from the scope of the invention or from the following claims.

I claim:

1. A plastic recyclable container, comprising, in combination, a plastic container body having a bottom and a continuous sidewall extending upwardly from said bottom, a pair of integral opposed ears defined in said sidewall, each of said ears defining an opening, a plastic handle having opposed ends, a plastic connector assembly positioned at each of said opposed ends of said plastic handle, each of said connector assemblies including a pair of inwardly directed projections forming a generally "V" shaped configuration received in said openings defined by said ears.

2. A plastic recyclable container, according to claim 1, wherein said openings have a generally rectangular shape and wherein said inwardly directed projections include holding members at their outer ends for retaining said handle in a pivotal relationship with said pair of opposed ears.

3. A plastic recyclable container, according to claim 2, wherein said projections have a generally rectangular cross-section complementary with said generally rectangular shape of said openings, whereby said handle is held in an upper position and in two opposed side positions.

4. A plastic recyclable container, according to claim 1, wherein said sidewall is cylindrical.

5. A plastic recyclable container, according to claim 4, including a plurality of circular reinforcing flanges integral with said sidewall.

6. A plastic recyclable container, according to claim 1, wherein said container is constructed of a high density polyethylene.

7. A plastic recyclable container comprising, in combination, a plastic container body having a bottom and a continuous sidewall extending upwardly from said bottom, a pair of integral opposed ears defined on said sidewall, each of said ears defining an opening, a plastic handle having opposed ends, a plastic connector assembly at each of said opposed ends of said plastic handle, each of said connector assemblies including a pair of inwardly directed projections forming a generally "V" shaped configuration received in said openings defined by said ears and a pair of holding members extending from said pair of inwardly directed projections for retaining said handle in a pivoting relationship with said pair of opposed ears.

8. A plastic recyclable container, according to claim 7, wherein said openings defined by said ears are generally rectangular, and wherein said projections have a complementary cross-section with said openings, whereby said handle is held in predetermined positions relative to said container body.

9. A plastic recyclable container, according to claim 7, wherein said sidewall is cylindrical.

10. A plastic recyclable container, according to claim 9, including a plurality of circular reinforcing flanges integral with said sidewall.

11. A plastic recyclable container, according to claim 8, wherein said container is constructed of a high density polyethylene.

12. A plastic recyclable container, according to claim 7 wherein each of said ears includes a wall spaced from said continuous sidewall, said wall defining said openings, said pair of holding members extending rearwardly to a position adjacent said wall.

* * * * *

UNITED STATES PATENT AND TRADEMARK OFFICE
CERTIFICATE OF CORRECTION

PATENT NO. : 5,505,331
DATED : April 9, 1996
INVENTOR(S) : W. John Rathbun

It is certified that error appears in the above-indentified patent and that said Letters Patent is hereby corrected as shown below:

Title page, item [75], inventor: should be -- Willard J. Rathbun--.

Signed and Sealed this

Thirtieth Day of July, 1996

Attest:

BRUCE LEHMAN

*Attesting Officer*  *Commissioner of Patents and Trademarks*